(12) United States Patent
Mori

(10) Patent No.: US 9,483,215 B2
(45) Date of Patent: Nov. 1, 2016

(54) PRINTING SYSTEM FOR ENABLING OPTIMIZATION OF PRINTER OPERATION RATE, PRINTING CONTROL DEVICE, AND RECORDING MEDIUM FOR RECORDING PRINTING CONTROL PROGRAM

(71) Applicant: DAINIPPON SCREEN MFG.CO., LTD., Kyoto (JP)

(72) Inventor: Takashi Mori, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 0 days.

(21) Appl. No.: 14/762,193

(22) PCT Filed: Sep. 12, 2013

(86) PCT No.: PCT/JP2013/074673
§ 371 (c)(1),
(2) Date: Jul. 20, 2015

(87) PCT Pub. No.: WO2014/115368
PCT Pub. Date: Jul. 31, 2014

(65) Prior Publication Data
US 2015/0324154 A1    Nov. 12, 2015

(30) Foreign Application Priority Data

Jan. 28, 2013  (JP) ................ 2013-013024

(51) Int. Cl.
*G06F 3/12* (2006.01)
*B41J 29/38* (2006.01)

(52) U.S. Cl.
CPC .............. *G06F 3/1215* (2013.01); *B41J 29/38* (2013.01); *G06F 3/122* (2013.01); *G06F 3/1247* (2013.01); *G06F 3/1267* (2013.01); *G06F 3/1282* (2013.01); *G06F 3/1285* (2013.01)

(58) Field of Classification Search
CPC ...... G06F 3/1215; G06F 3/12; G06F 3/1285; G06F 3/1267; G06F 3/1247; G06F 3/1282; G06F 3/122; B41J 29/38
USPC ........................................ 358/1.15
See application file for complete search history.

(56) References Cited

U.S. PATENT DOCUMENTS 6,480,295 B1   11/2002  Taoda
7,016,061 B1*   3/2006  Hewitt .................. G06F 3/1213
                                                          358/1.13
(Continued)

FOREIGN PATENT DOCUMENTS

JP       11-177788 A    7/1999
JP      2001-260429 A   9/2001
(Continued)

OTHER PUBLICATIONS

International Search Report PCT/JP2013/074673 dated Nov. 26, 2013 with English translation.

*Primary Examiner* — Andrew H Lam
(74) *Attorney, Agent, or Firm* — McDermott Will & Emery LLP

(57) ABSTRACT

To provide a printing system, printing control device, and printing control program that can optimize the operating rate of a printer. An operation optimization processing part includes a comparison part and an output destination determination part, and performs a process that in order to the optimize the operating status of a printer, before an RIP process is performed, in accordance with a condition determined by the relationship between an RIP processing speed and a printing speed, for each print data, preliminarily determines a raster data output destination for temporarily storing raster data generated by performing the RIP process of the print data.

9 Claims, 7 Drawing Sheets

(56) References Cited

U.S. PATENT DOCUMENTS

| | | |
|---|---|---|
| 2010/0134844 A1 | 6/2010 | Ito |
| 2010/0296127 A1* | 11/2010 | Barndt ............... B41J 3/50 358/3.24 |
| 2012/0182581 A1* | 7/2012 | Fujita ............... G06K 15/1856 358/1.16 |

FOREIGN PATENT DOCUMENTS

| | | |
|---|---|---|
| JP | 2002-182875 A | 6/2002 |
| JP | 2009-78503 A | 4/2009 |
| JP | 2010-128941 A | 6/2010 |
| JP | 2013-16005 A | 1/2013 |

\* cited by examiner

PRINTING SYSTEM FOR ENABLING OPTIMIZATION OF PRINTER OPERATION RATE, PRINTING CONTROL DEVICE, AND RECORDING MEDIUM FOR RECORDING PRINTING CONTROL PROGRAM

CROSS-REFERENCE TO RELATED APPLICATIONS

This Application is the U.S. National Phase of PCT/JP2013/074673 filed Sep. 12, 2013, which claims priority to Japanese Patent Application No. 2013-013024 filed Jan. 28, 2013. The subject matter of each is incorporated herein by reference in entirety.

TECHNICAL FIELD

The present invention relates to a printing system, printing control device, and printing control program.

BACKGROUND ART

There has been known a printing system that prints on a print medium by a digital printer or the like via an RIP (Raster Image Processor) process that converts print data, which describes a printer output image in a page description language, to raster data printable by the printer.

In such a printing system, the processing speed of the RIP process varies depending on an information amount of print data prepared for a print target by page. Also, in the case where the processing speed of the RIP process is lower than the printing speed of a printer side, "waiting time" occurs in the printer. When the "waiting time" occurs, the operation rate of the printer is reduced. For this reason, there is proposed a printing control device that estimates a RIP processing time to prepare an execution schedule for multiple print jobs on the basis of the estimated RIP processing time, and thereby efficiently schedules the print jobs to efficiently operate a printer (see Patent Literature 1).

FIG. 7 is a schematic diagram illustrating a raster data transfer operation from an RIP processing part 436 to a printer 300 in a printing control device of a conventional printing system. FIG. 7(a) illustrates the case of writing raster data after the RIP process in a hard disk 407, and then reading the raster data from the hard disk 407 to transfer the raster data to the printer 300, whereas FIG. 7(b) illustrates the case of temporarily storing raster data after the RIP process in a memory 402, and then transferring the raster data to the printer 300.

In the conventional printing system, the raster data generated by the RIP process is stored in the memory (main storage device) 402 of a personal computer, which functions as the printing control device, or written and stored in the hard disk (auxiliary storage device) 407, and then transferred to the printer 300. As illustrated in FIG. 7(a), in the case of writing the raster data after the RIP process in the hard disk 407, and then reading the raster data from the hard disk 407 to transfer the raster data to the printer 300, a large amount of data can be stored in the hard disk 407. On the other hand, as illustrated in FIG. 7(b), in the case of temporarily storing the raster data after the RIP process in the memory 402, and then transferring the raster data to the printer 300 (on-the-fly method), as compared with storing in the hard disk 407, only a short data access time is required, and therefore a time from the RIP process to printing can be shortened.

CITATION LIST

Patent Literature

Patent Literature 1
  Japanese Unexamined Patent Publication JP-A2002-182875

SUMMARY OF INVENTION

Technical Problem

As illustrated in FIG. 7(a), in the case of storing the raster data after the RIP process in the hard disk 407, and then transferring the raster data to the printer 300, there is a problem that a data access time is longer than the on-the-fly method illustrated in FIG. 7(b), and therefore if a processing speed of the RIP process is lower than a printing speed, a "waiting time" on the printer side becomes longer and the operating rate of the printer reduces.

On the other hand, as illustrated in FIG. 7(b), in the case of temporarily storing the raster data after the RIP process in the memory 402, and then transferring the raster data to the printer 300, if the processing speed of the RIP process is higher than the printing speed, pieces of data waiting to be transferred to the printer 300 are accumulated in the memory 402, thereby possibly causing a memory shortage. As a result, performance of the personal computer functioning as the print control device reduces.

The present invention is made in order to solve the above-described problems, and intends to provide a printing system, printing control device, and printing control program that can optimize the operating rate of a printer.

Solution to Problem

An invention according to a first aspect is a printing system including: a print data processing device that performs a conversion process of a print target described in a page description language to raster data; and a printer that on a basis of the raster data prepared by the print data processing device, executes printing on a recording medium, in which the print data processing device includes: processing time estimating means adapted to estimate a time necessary for the conversion process of the print target to the raster data; printing speed acquisition means adapted to acquire a printing speed at which the printer executes printing; first storage means adapted to electrically record the raster data with use of a semiconductor element, and second storage means adapted to magnetically record the raster data with use of a magnetic material, which are for, when the raster data is prepared by the conversion process, temporarily storing the raster data; determination means adapted to determine whether to, on a basis of the estimated time estimated by the processing time estimating means and the printing speed acquired from the printer, store the raster data prepared by the conversion process in the first storage means or in the second storage means; and transfer means adapted to, on a basis of the determination by the determination means, transfer the raster data stored in the first storage means or in the second storage means to the printer.

An invention according to a second aspect is the invention according to the first aspect, in which the printing speed is represented by a conveyance amount of the recording medium per unit time; and the determination means calculates a print time from a recording medium amount necessary to print the print target in the printer operating at the printing speed, in a case where the estimated time is shorter than the print time, determines to store the raster data in the second storage means, and in a case where the estimated time is longer than the print time, determines to store the raster data in the first storage means.

An invention according to a third aspect is the invention according to the first aspect, in which the printing speed is represented by a conveyance amount of the recording medium per unit time; and the determination means calculates a conveyance amount of the recording medium conveyed during the estimated time in the printer operating at the printing speed, in a case where the conveyance amount of the recording medium is smaller than a recording medium amount necessary to print the print target in the printer, determines to store the raster data in the second storage means, and in a case where the conveyance amount of the recording medium is larger than the recording medium amount necessary to print the print target in the printer, determines to store the raster data in the first storage means.

An invention according to a fourth aspect is the invention according to any of the first to third aspects, in which the printer executes printing on a roll sheet in a plateless manner.

An invention according to a fifth aspect is the invention according to any of the first to third aspects, in which the printer executes printing on a sheet in a plateless manner.

An invention according to a sixth aspect is a printing control device that controls a printing system including: a print data processing device that performs a conversion process of a print target described in a page description language to raster data; and a printer that on a basis of the raster data prepared by the print data processing device, executes printing on a recording medium, and the printing control device includes: processing time estimating means adapted to estimate a time necessary for the conversion process of the print target to the raster data; printing speed acquisition means adapted to acquire a printing speed at which the printer executes printing; first storage means adapted to electrically record the raster data with use of a semiconductor element, and second storage means adapted to magnetically record the raster data with use of a magnetic material, which are for, when the raster data is prepared by the conversion process, temporarily storing the raster data; determination means adapted to determine whether to, on a basis of the estimated time estimated by the processing time estimating means and the printing speed acquired from the printer, store the raster data prepared in the first storage means or in the second storage means; and transfer means adapted to, on a basis of the determination by the determination means, transfer the raster data stored in the first storage means or in the second storage means to the printer.

An invention according to a seventh aspect is the invention according to the sixth aspect, in which the printing speed is represented by a conveyance amount of the recording medium per unit time; and the determination means calculates a print time of the print target in the printer operating at the printing speed, in a case where the estimated time is shorter than the print time, determines to store the raster data in the second storage means, and in a case where the estimated time is longer than the print time, determines to store the raster data in the first storage means.

An invention according to an eighth aspect is the invention according to the sixth aspect, in which the printing speed is represented by a conveyance amount of the recording medium per unit time; and the determination means calculates a conveyance amount of the recording medium conveyed during the estimated time in the printer operating at the printing speed, in a case where the conveyance amount of the recording medium is smaller than a recording medium amount necessary to print the print target in the printer, determines to store the raster data in the second storage means, and in a case where the conveyance amount of the recording medium is larger than the recording medium amount necessary to print the print target in the printer, determines to store the raster data in the first storage means.

An invention according to a ninth aspect is a printing control program executed by a CPU of a computer in a memory in order to make the computer function as a printing control device in a printing system including: a print data processing device that performs a conversion process of a print target described in a page description language to raster data; and a printer that on a basis of the raster data prepared by the print data processing device, executes printing on a recording medium, and the printing control program includes: a processing time estimating step of estimating a time necessary for the conversion process of the print target to the raster data; a printing speed acquisition step of acquiring a printing speed at which the printer executes printing; a determination step of determining whether to, on a basis of the estimated time estimated in the processing time estimating step and the printing speed acquired from the printer, store the raster data in first storage means adapted to use a semiconductor element to do electrical recording or in second storage means adapted to do magnetic recording;

a conversion processing step of converting the print target to the raster data; a storage step of, on a basis of the determination in the determination step, temporarily recording the raster data prepared in the conversion processing step in the first storage means or in the second storage means; and a transfer step of transferring the raster data stored in the first storage means or in the second storage means to the printer.

Advantageous Effects of Invention

According to the inventions according to the first to ninth aspects, an RIP processing estimated time estimated before the RIP process for each print target, and the print time are compared with each other to determine preliminarily before the RIP process which of the first storage means and the second storage means an output destination of raster data after the RIP process is set to, and in accordance with the determination, printing control that temporarily stores the raster data and performs a data transfer operation of the data to the printer is performed, so that the operating rate of the printer 300 can be optimized, and the operating status of the whole of the printing system can also be optimized.

DESCRIPTION OF EMBODIMENTS

Figure 1:
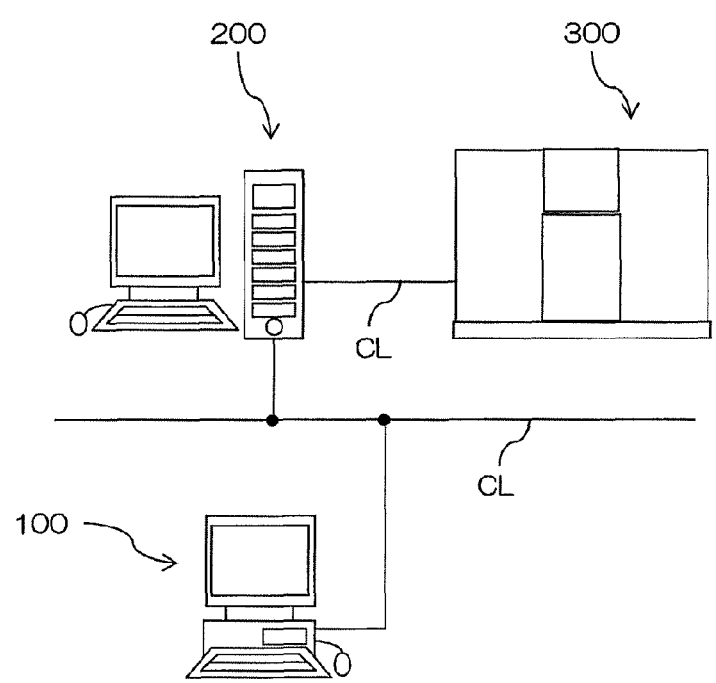
FIG. 1 is a schematic diagram of a printing system.

In the following, embodiments of the present invention will be described on the basis of the drawings. FIG. 1 is a schematic diagram of a printing system.

This printing system includes: a printer 300 that executes printing on the basis of digital data; and a printing control device (hereinafter referred to as a "controller") 200 that functions as a print data processing device that performs an RIP process for converting print data to raster data processable by the printer 300, as well as supplying the raster data to the printer 300. The controller 200 and the printer 300 can mutually transceive various types of information via a communication line CL connected to a network such as an LAN (Local Area Network).

A client computer (hereinafter referred to as a "client") 100 is connected to the controller 200 via the communication line CL. The client 100 is one that edits and prepares a print target, edits characters and patterns constituting a print, and prepares print data described in a page description language such as a PDF (Portable Document Format). Also, instructions such as execution of printing and a pause can be issued to the printer 300 via input devices connected to the client 100, such as a keyboard and a mouse.

Figure 2:
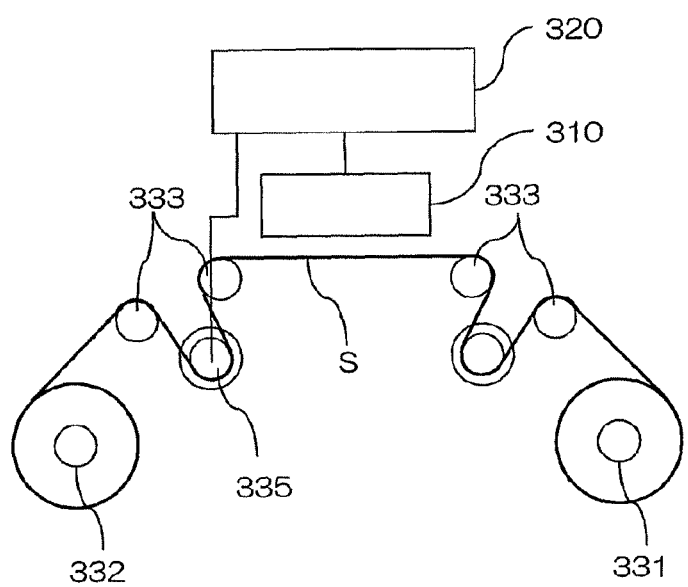
FIG. 2 is a schematic diagram of a printer 300.
Figure 3:
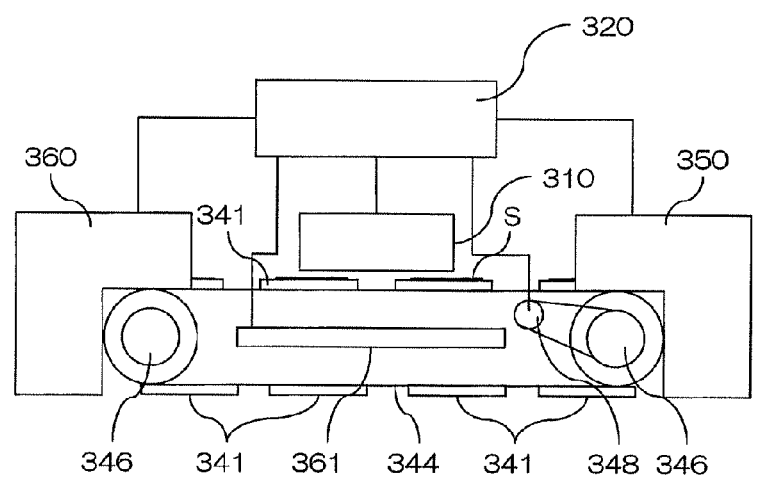
FIG. 3 is a schematic diagram of another printer 300.

FIGS. 2 and 3 are schematic diagrams of the printer 300. The printer 300 is one that executes printing on a recording medium such as a print sheet on the basis of data inputted from the client 100 via the controller 200.

The printer 300 illustrated in FIG. 2 is one that, in accordance with an inkjet method, records an image on a print sheet S in the form of a roll sheet that is wound on an unwinding roller 331, a winding roller 332, and multiple tension rollers 333, and conveyed by the drive of a drive motor 335. The printer 300 includes: a recording part 310 having multiple inkjet heads in which nozzles adapted to eject ink are arrayed; and a control part 320. The control part 320 performs print control for ejecting ink from nozzles and drive control of the drive motor 335 on the basis of raster data after the RIP process inputted from the controller 200.

On the other hand, the printer 300 illustrated in FIG. 3 is one that in accordance with the inkjet method, records an image on a print sheet S that is referred to as a sheet and sucked on each of multiple tables 341 moving along a circulating track. This printer 300 includes: a paper feeding part 350 that feeds a print sheet S to a table 341; and a paper discharging part 360 that collects a printed print sheet S from a table 341. Also, the printer 300 includes, as with the printer 300 illustrated in FIG. 2, a recording part 310 having multiple inkjet heads in which nozzles adapted to eject ink are arrayed, and a control part 320. A table 341 of the printer 300 is moved by a table conveyance mechanism including: an endless conveyance mechanism that is connected to a chain 344 wound on a pair of sprockets 346, and moves the table 341 from the paper discharging part 360 toward the paper feeding part 350 by the drive of a drive sprocket 348 that is rotated by the drive of a motor; and a linear motor mechanism 361 that is for, when the table 341 passes below the recording part 310, separating the table 341 from the endless conveyance mechanism to accurately move the table 341. The control part 320 of the printer 300 performs: supply control of a print sheet S from the paper feeding part 350 to a table 341; paper discharging control that collects a print sheet S from a table 341 to the paper discharging part 360; print control that ejects ink from nozzles on the basis of raster data after the RIP process inputted from the controller 200; and table conveyance control that controls the drive of the drive sprocket 348 and the operation of the linear motor mechanism 361.

Although the each printer 300 illustrated in FIGS. 2 and 3 is one that records an image in accordance with the inkjet method, as a printing method of a printer in this printing system, for example, an electrophotographic method that as with the inkjet method, executes printing in a plateless manner can also be employed.

Figure 4:
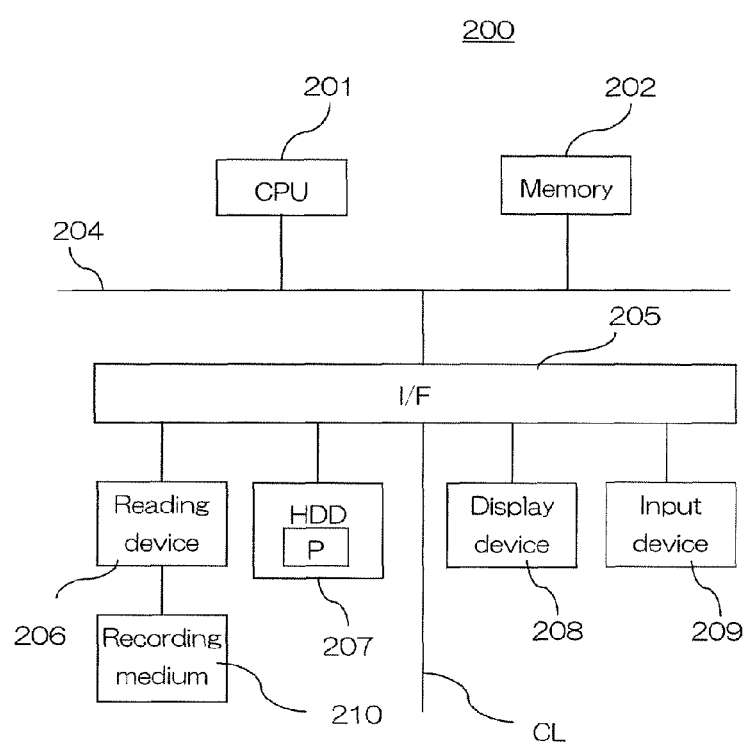
FIG. 4 is a block diagram illustrating a hardware configuration of the controller 200.

FIG. 4 is a block diagram illustrating a hardware configuration of the controller 200.

The controller 200 is realized using a computer, and includes: a CPU 201; a memory 202 that includes a ROM and a RAM and stores information using a semiconductor element; an interface 205; a reading device 206 such as a disk drive that reads information stored in a portable recording medium 210 such as a CD-ROM; an HDD (hard disk) 207 that magnetically stores information using a magnetic material; a display device 208 such as a liquid crystal display; and an input device 209 including a keyboard, a mouse, and the like. The CPU 201, memory 202, and interface 205 are mutually connected via a bus 204. The interface 205 is connected with the reading device 206, HDD 207, display device 208, input device 209, and communication line CL.

The controller 200 is adapted to be communicable with the client 100 and the printer 300 via the communication line CL connected to the interface 205. The HDD 207 stores various types of data such as raster data after the RIP process, and programs. When executing a program stored in the HDD 207, the program is loaded in the ROM of the memory 202, and a function of the program is realized using the RAM and the CPU 201. For example, the CPU 201 executes an RIP processing program, and thereby the controller 200 functions as an RIP processing device. Also, the display device 208 displays various types of information such as print job execution status, and the input device 209 is used for various types of input operations by an operator.

Note that the memory 202 corresponds to first storage means of this invention, and the HDD 207 corresponds to second storage means of this invention. Also, a print control program of this invention may be recorded in the portable recording medium 210 such as a CD-ROM. In the case where the print control program of this invention is recorded in the recording medium 210, the controller 200 uses the reading device 206 to read the program P from the recording medium 210, and records the program P in the HDD 207. Further, when the print control program is executed, the program P is loaded in the ROM of the memory 202, and a function of the program P is realized using the RAM and the CPU 201.

Figure 5:
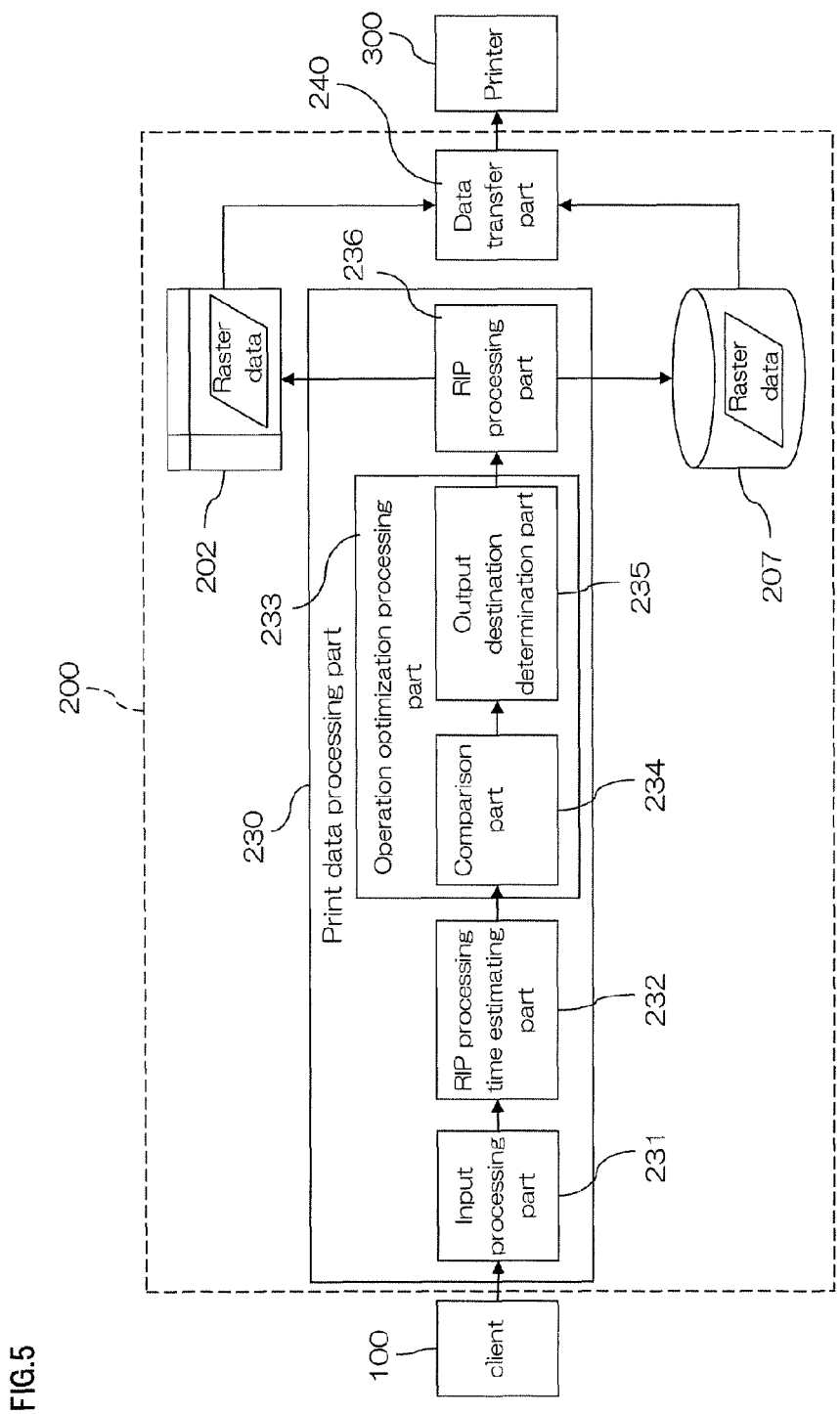
FIG. 5 is a block diagram illustrating a functional configuration of the controller 200.

FIG. 5 is a block diagram illustrating a functional configuration of the controller 200.

The controller 200 includes: a print data processing part 230 that converts print data transmitted from the client 100 to raster data understandable by the printer 300; and a data transfer part 240 that transfers raster data to the printer 300.

The print data processing part 230 includes: an input processing part 231 that receives print data from the client 100; an RIP processing time estimating part 232 that estimates an RIP processing time of each print data; an operation optimization processing part 233; and an RIP processing part 236 that performs the RIP process.

The input processing part 231 receives print data sent from the client 100, such as PDF, and analyzes the content of the print data, such as object information. Also, the RIP processing time estimating part 232 estimates an RIP processing time of each print data on the basis of a result of the analysis by the input processing part 231.

The operation optimization processing part 233 performs a process that in order to optimize the operational status of the printer 300, before the RIP process is performed, in accordance with a condition determined by the relationship between an RIP processing speed and a printing speed, for each print data, preliminarily determines a raster data output destination for temporarily storing raster data generated by performing the RIP process of print data.

The operation optimization processing part 233 includes a comparison part 234 and an output destination determination part 235, and functions as determination means in the present invention. The comparison part 234 acquires the printing speed (e.g., the number of print pages per minute) set on the printer 300 side, and compares an RIP process estimated time estimated by the RIP processing time estimating part 232, and a print time obtained on the basis of the printing speed with each other. Further, the output destination determination part 235 makes an output destination determination that on the basis of a result of the comparison by the comparison part 234, preliminarily determines whether to, when print data for which an RIP processing time is estimated by the RIP processing time estimating part 232 is subsequently subjected to the RIP process and converted to raster data, store the raster data in the memory 202 or in the HDD 207. Note that the operation optimization processing part 233 acquires the printing speed in the comparison part 234, and therefore also functions as printing speed acquisition means in the present invention.

Raster data generated in the RIP processing part 236 is outputted to any of the memory 202 and the HDD 207 on the basis of the determination by the output destination determination part 235.

The data transfer part 240 reads raster data recorded in any of the memory 202 and the HDD 207 and transfers the raster data to the printer 300 in accordance with a print execution sequence.

Figure 6:
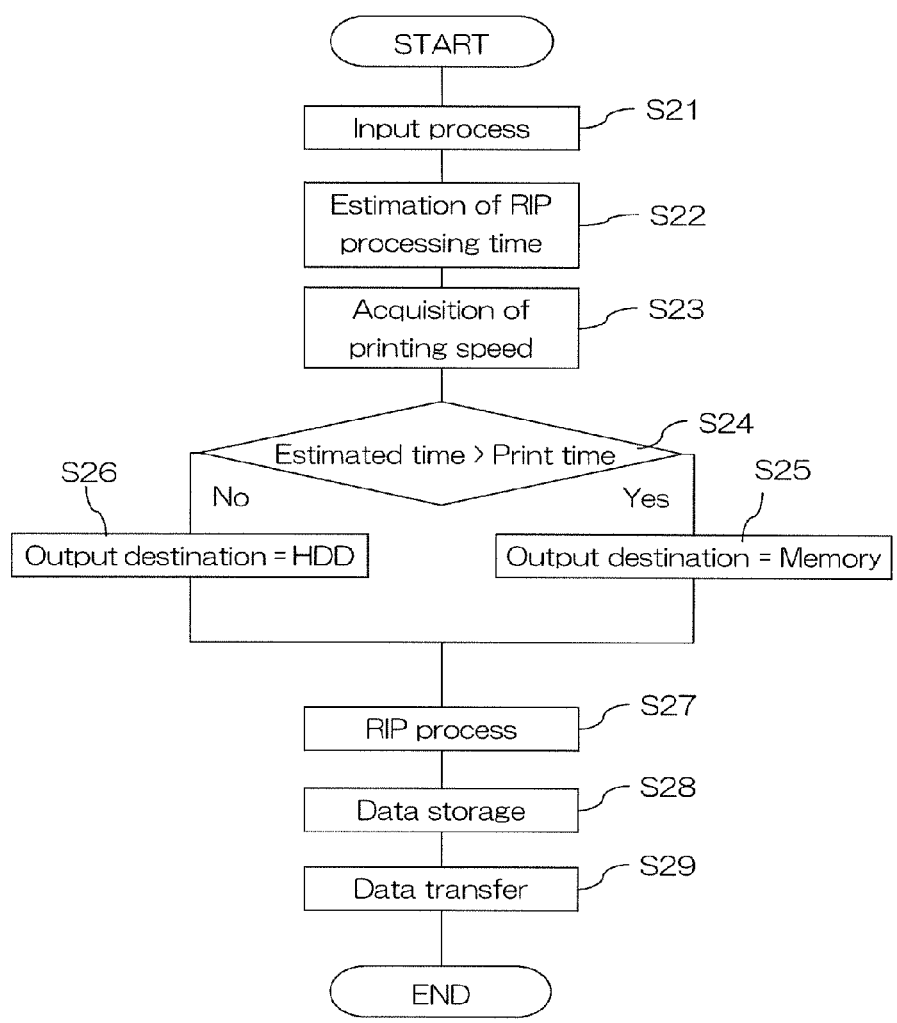
FIG. 6 is a flowchart illustrating a data processing procedure by the controller 200.
Figure 7:
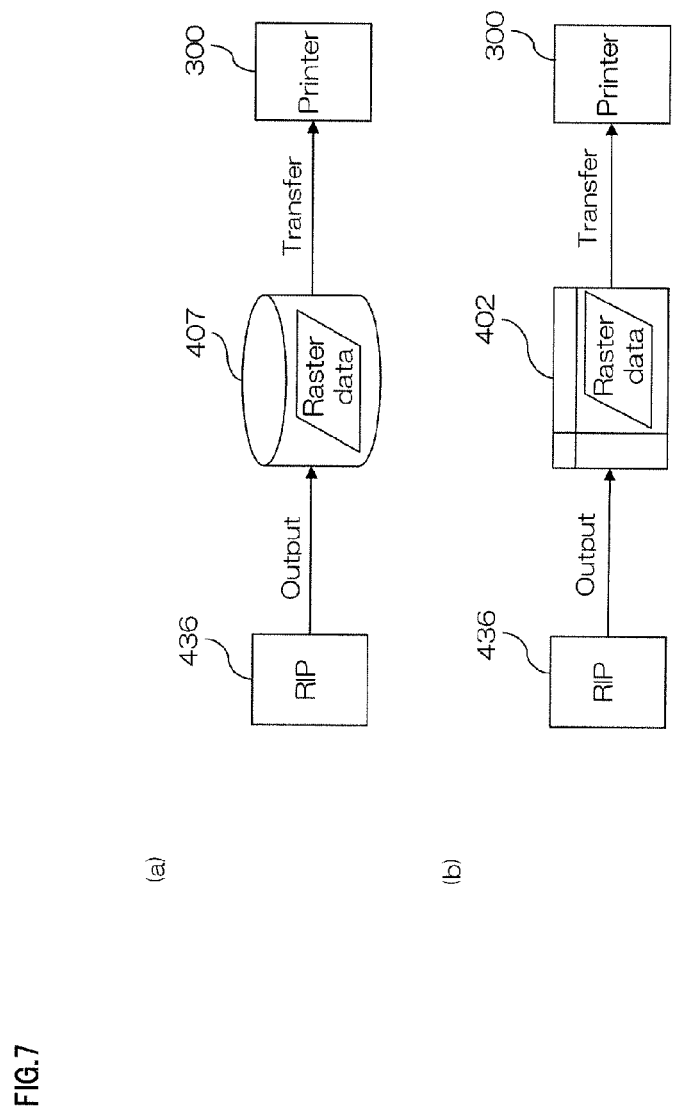
FIG. 7 is a schematic diagram illustrating a raster data transfer operation from an RIP processing part 436 to a printer 300 in a printing control device of a conventional printing system.

FIG. 6 is a flowchart illustrating a data processing procedure by the controller 200.

When print data is inputted from the client 100, an input process is performed (Step S21). In the input process step, for example, in accordance with which ordinal number the print data received by the input processing part 231 corresponds to, input information on the print data is added to a schedule providing a print execution sequence, and the print data is analyzed. By analyzing the print data, drawing instructions (drawing operators) included in the print data, the number of instructions in each of the drawing operators, graphic size information, and the like can be acquired.

Then, an RIP processing time is estimated (Step S22). In Step S22, on the basis of the pieces of information acquired by the analytical operation of the print data in Step S21, the RIP processing time is estimated. The estimate of the RIP processing time (RT) can be calculated using, for example, the following expression (1).

$$RT=TS+TG \qquad (1)$$

Here, TS represents the sum of times necessary to perform stroke operators among the drawing operators, and TG is the sum of times necessary to perform image operators among the drawing operators. By preparing a table in which a time necessary to process one of instructions in each of the drawing operators is experimentally obtained, the RIP processing time can be calculated with reference to the table. Note that a method for estimating the RIP processing time is not limited to this.

After the completion of the RIP processing time estimation, a printing speed of the printer 300 is acquired (Step S23). The printing speed is a printing speed that was preliminarily set in the printer 300 using the input device 209 of the controller 200, or the like. After the acquisition of the printing speed, a print time necessary to print raster data for which the RIP processing time was estimated is calculated from the printing speed. Note that the printing speed is represented by a conveyance amount of the print sheet S per unit time. Accordingly, a recording medium amount in this invention refers to the number of print sheets S in the case of a sheet, and in the case of a roll sheet, the length of the print sheet S.

For example, in the case where the printer 300 is one that executes printing on the sheets illustrated in FIG. 3, the printing speed is set as a conveyance amount of the print sheets S as sheets per unit time (the number of sheets per minute). In this case, the print time for one page of print target is obtained from the printing speed, and the calculated print time and the RIP processing estimated time are compared with each other (Step S24).

On the other hand, in the case where the printer 300 is one that executes printing on the roll sheet illustrated in FIG. 2, the printing speed is set as a conveyance amount of the print sheet S as a roll sheet per unit time (meters per minute). In this case, it is only necessary that a time necessary to convey the roll sheet the length of the sheet corresponding to one page is calculated as the print time, and compared with the RIP processing estimated time.

In Step S24, in the case where it is determined that the RIP processing estimated time is longer than the print time, it is determined that the raster data obtained after performing the RIP process of the print data for which the RIP processing time was estimated is stored in the memory 202. Then, the memory 202 is stored as the assignment of an output destination in relation to the pieces of information of the print data, such as the print execution sequence and page numbers (Step S25).

On the other hand, in Step S24, in the case where it is determined that the RIP processing estimated time is shorter than the print time, it is determined that the raster data obtained after performing the RIP process of the print data for which the RIP processing time was estimated is stored in the HDD 207. Then, the HDD 207 is stored as the assignment of the output destination in relation to the pieces of information of the print data, such as the print execution sequence and page numbers (Step S26).

After an output destination of raster data after the RIP process has been assigned for each print data as a result of the comparison in Step S24, the RIP process is then performed (Step S27). Each raster data after the RIP process is outputted to and stored in any of the memory 202 and the HDD 207 determined as an output destination before the RIP process.

Each raster data temporarily stored in any of the memory 202 and the HDD 207 is read toward the data transfer part 240 from any of the memory 202 and the HDD 207 in accordance with the print execution sequence, and transferred to the printer 300 (Step S29).

The CPU 201 of the controller 200 performs a printing control program of this invention in the memory 202, and thereby each of the above-described steps is realized.

In this embodiment, in the case where an RIP processing estimated time is longer than a print time, raster data is stored in the memory 202 having a shorter data access time than the HDD 207, and thereby the raster data after the RIP process can be quickly transferred to the printer 300 to prevent an increase in "waiting time" of the printer 300. On the other hand, in the case where an RIP processing estimated time is shorter than a print time, storing in the HDD 207 capable of storing a large amount of data although a data access time is longer than the memory 202 makes it possible to prevent the performance of the controller 200 from being reduced by the accumulation of pieces of raster data waiting for printing in the memory 202.

Note that in the above-described embodiment, in Step S24, the RIP processing estimated time and the print time are compared with each other; however, since the printing speed is set as the conveyance amount of the print sheet S, the amount of the print sheet S conveyable in the printer 300 operating at the set printing speed during the RIP processing estimated time, and the amount of the print sheet S necessary to print the raster data after the RIP process by the printer 300 may be obtained by calculation and compared with each other. In this case, in the case where the amount of the print sheet S necessary for actual printing is smaller than the amount of the print sheet S conveyable during the RIP processing estimated time, the RIP processing speed is smaller than the printing speed, and therefore it is determined that the raster data after the RIP process is stored in the memory 202. On the other hand, in the case where the amount of the print sheet S necessary for actual printing by the printer 300 is larger than the amount of the print sheet S conveyable during the RIP processing estimated time, the printing speed is smaller than the RIP processing speed, and therefore it is determined that the raster data after the RIP process is stored in the HDD 207.

As described, in this invention, an RIP processing estimated time for each print data estimated before the RIP process, and a print time are compared with each other to determine for each print data preliminarily before the RIP process which of the storage means having different access times an output destination of raster data after the RIP process is set to, and in accordance with the determination, the raster data is temporarily stored and subjected to a data transfer operation to the printer, so that the operating status of the whole of the printing system can be optimized while keeping the operating rate of the printer 300 at a high level.

REFERENCE SIGNS LIST

100 Client
200 Controller
201 CPU
202 Memory
204 Bus
205 Interface
206 Reading device
207 HDD
208 Display device
209 Input device
230 Print data processing part
231 Input processing part
232 RIP processing time estimating part
233 Operation optimization processing part
234 Comparison part
235 Output destination determination part
236 RIP processing part
240 Data transfer part
300 Printer
P Program

The invention claimed is:
1. A printing system comprising:
a printer, configured to receive raster data and execute printing;
a controller, connected to the printer and configured to receive print data from a client computer, comprising:
a memory;
a hard drive;
a processor, configured to:
estimate a time necessary for a conversion process of the print data to raster data;
acquire a printing speed at which the printer executes printing;
determine whether to, on a basis of the estimated time and the printing speed, store raster data prepared by the conversion process in the memory or in the hard drive, wherein the memory is selected to store the raster data if a print time to print the print data at the print speed is shorter than the estimated time, and the hard drive is selected to store the raster data if the print time is longer than the estimated time;
based on the determination, cause the memory or the hard drive to store the raster data prepared by the conversion process; and
cause the stored raster data to be transferred to the printer.

2. The printing system according to claim 1, wherein:
the printing speed is represented by a conveyance amount of a recording medium per unit time; and
the processor is configured to calculate the print time from a recording medium amount necessary to print the print data with the printer operating at the printing speed.

3. The printing system according to claim 1, wherein:
the printing speed is represented by a conveyance amount of a recording medium per unit time; and
wherein the processor is configured to determine whether the print time to print the print data at the print speed is longer or shorter than the estimated time by calculating a conveyance amount of the recording medium conveyed during the estimated time with the printer operating at the printing speed,
wherein, the print time is determined to be longer than the estimated time if the conveyance amount of the recording medium is smaller than a recording medium amount necessary to print the print data with the printer, and the print time is determined to be shorter than the estimated time if the conveyance amount of the recording medium is larger than the recording medium amount necessary to print the print data with the printer.

4. The printing system according to any of claims 1 to 3, wherein the printer executes printing on a roll sheet in a plateless manner.

5. The printing system according to any of claims 1 to 3, wherein the printer executes printing on a sheet in a plateless manner.

6. A controller, capable of being connected to a printer and to receive print data from a client computer, comprising:
a memory;
a hard drive;
a processor, configured to:
estimate a time necessary for a conversion process of the print data to raster data;
acquire a printing speed at which the printer executes printing;
determine whether to, on a basis of the estimated time and the printing speed, store raster data in the memory or in the hard drive, wherein the memory is selected to store the raster data if a print time to print the print data at the print speed is shorter than the estimated time, and the hard drive is selected to store the raster data if the print time is longer than the estimated time;

based on the determination, cause the memory or the hard drive to store the raster data prepared by the conversion process; and cause the stored raster data to be transferred to the printer.

7. The printing control device according to claim 6, wherein:

the printing speed is represented by a conveyance amount of a recording medium per unit time; and the processor is configured to calculate the print time from a recording medium amount necessary to print the print data with the printer operating at the printing speed.

8. The printing control device according to claim 6, wherein the printing speed is represented by a conveyance amount of a recording medium per unit time; and wherein the processor is configured to determine whether the print time to print the print data at the print speed is longer or shorter than the estimated time by calculating a conveyance amount of the recording medium conveyed during the estimated time with the printer operating at the printing speed, wherein, the print time is determined to be longer than the estimated time if the conveyance amount of the recording medium is smaller than a recording medium amount necessary to print the print data with the printer, and the print time is determined to be shorter than the estimated time if the conveyance amount of the recording medium is larger than the recording medium amount necessary to print the print data in with the printer.

9. A non-transitory storage medium storing a computer-executable program for causing a processor to execute a printing control program, the printing control program comprising the steps of:

estimating a time necessary for a conversion process of print data to raster data;

acquiring a printing speed at which a printer executes printing;

determining whether to, on a basis of the estimated time and the printing speed, store raster data in a memory or in a hard drive, wherein the memory is selected to store the raster data if a print time to print the print data at the print speed is shorter than the estimated time, and the hard drive is selected to store the raster data if the print time is longer than the estimated time;

converting the print data to the raster data;

based on the determination, causing the memory or the hard drive to store the raster data prepared in the converting step; and cause the stored raster data to be transferred to the printer.

* * * * *